US006087470A

United States Patent [19]
Liaw et al.

[11] Patent Number: 6,087,470
[45] Date of Patent: Jul. 11, 2000

[54] PREPARATION OF SOLUBLE POLYAMIDE, POLYIMIDE AND POLY(AMIDE-IMIDE)

[75] Inventors: Der-Jang Liaw; Been-Yang Liaw, both of Taipei, Taiwan

[73] Assignee: National Science Council of Republic of China, Taipei, Taiwan

[21] Appl. No.: 09/107,330

[22] Filed: Jun. 30, 1998

[51] Int. Cl.[7] ................................................. C08G 73/10

[52] U.S. Cl. .......................... 528/310; 528/170; 528/172; 528/173; 528/174; 528/179; 528/322; 528/332; 528/335; 528/336

[58] Field of Search .................................. 528/170, 172, 528/310, 173, 174, 179, 332, 335, 336

[56] References Cited

U.S. PATENT DOCUMENTS

| | | | |
|---|---|---|---|
| 4,278,786 | 7/1981 | Nanaumi et al. | 528/172 |
| 4,595,745 | 6/1986 | Nakano et al. | 528/125 |
| 5,084,557 | 1/1992 | Murata et al. | 528/353 |
| 5,268,487 | 12/1993 | Yang et al. | 548/456 |
| 5,414,070 | 5/1995 | Yang et al. | 528/310 |
| 5,844,065 | 12/1998 | Liaw et al. | 528/353 |
| 5,939,521 | 8/1999 | Chuang | 528/353 |

Primary Examiner—P. Hampton-Hightower

[57] ABSTRACT

The new diamine, "3,3',5,5'-tetramethyl-2,2-bis[4-(4-aminophenoxy)phenyl]propane" was synthesized and used to prepare high performance soluble engineering plastics by polycondensation. The polymer can be polyamides, polyimides or poly(amide-imide)s. These polymers exhibit excellent solubility, processability, heat resistance and mechanical performance.

5 Claims, 2 Drawing Sheets

PREPARATION OF SOLUBLE POLYAMIDE, POLYIMIDE AND POLY(AMIDE-IMIDE)

BACKGROUND OF THE INVENTION

1. Field of the Invention

The present invention relates to a diamine, and also to polymers such as polyamides, polyimides and poly(amide-imide)s polymerized therefrom.

2. Description of the Prior Art

Aromatic polyamides and polyimides are well known as high-performance polymers, which possess excellent thermal stability, inert behavior against organic solvents, and good mechanical properties. Although wholly aromatic polymers have a higher melting point and a higher heat resistance than aliphatic polymers. However, as their rigid structures cause high softening temperature and poor solubility to many organic solvents, it was often difficult to fabricate them. For instance, wholly aromatic polyamides are insoluble in organic solvents without the aid of a solution promoter such as LiCl or $CaCl_2$, and such polyamides have no softening point and hence, are infusible. Accordingly, their application is considerably limited. Thus, the improvement of their processability has been extensively investigated.

One of the successful approaches to increase solubility of polyamides and polyimides is the introduction of flexible linkages into polymer backbone. For instance, the incorporation of flexible linkages, such as arylene ether (—O—) [EP 0565352 A2, JP 05262705], methylene (—$CH_2$—) [EP 0483954 A1], sulfone (—$SO_2$—) [JP 05295262], isopropylidene [—C($CH_3$)$_2$—] [U.S. Pat. No. 4,410,684, JP 04183721], and siloxane (—Si—O—) [JP 052141000, JP 04189867] into the polymer backbone to increase the overall chain flexibility.

SUMMARY OF THE INVENTION

The present invention relates to a diamine, 3,3',5,5'-tetramethyl-2,2-bis[4-(4-aminophenoxy)phenyl]propane, bearing both flexible ether and isopropylidene bridges between the phenylene units, and tetra methyl substituent on the phenylene unit. The incorporation of these flexible linkages into the polymer backbone effectively reduces the crystallinity, and enhance the solubility of the polyamides, polyimides and poly(amide-imide)s. In addition, several literatures had reported that the tetramethyl substituent on the phenylene unit would make the polymer less polar in nature, indicating that the methyl-substituted arylene would also effectively enhance the solubility of these polymers. On the other hand, polymer with methyl substituent on arylene shows excellent thermo-oxidative stability. According to that mentioned above, introduction of both flexible ether and isopropylidene bridges and methyl-substituted arylene into polymer backbone would be expected to be a potential structural modifications to the polymers.

Thus, the new diamine (3,3',5,5'-tetramethyl-2,2-bis[4-(4-amino-phenoxy)phenyl]propane), the corresponding diimide-diacid (3,3',5,5'-tetramethyl-2,2-bis[4-(4-trimellitimidophenoxy)phenyl]propane), and their related polymers should be novel monomers and materials respectively. It is therefore an object of the present invention to provide a polymer having good soluble processability, heat-resistivity and mechanical strength. The present invention provides a series of polymers including polyamides and polyimides capable of being polycondensated from diamine, 3,3',5,5'-tetramethyl-2,2-bis[4-(4-aminophenoxy)phenyl]propane, with various dicarboxylic acids and various aromatic dianhydrides, respectively. Poly(amide-imide)s are preparation by the polycondensation by the diimide-diacids (3,3',5,5'-tetramethyl-2,2-bis[4-(4-trimellitimidophenoxy)-phenyl]propane), which is condensed from 3,3',5,5'-tetramethyl-2,2-bis[4-(4-aminophenoxy)phenyl]propane and trimellitic anhydride, with various diamines.

If we allow such diamine and diimide-diacid to react with the dicarboxylic acid (or dianhydride), we can obtain polycondensated polymers including polyamides, polyimides, and poly(amide-imide)s having the following general formula:

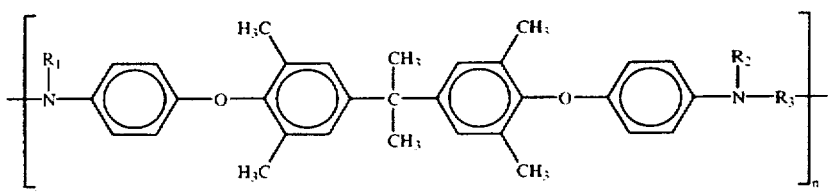

(i) if $R_1$ and $R_2$ both are protons (H), then $R_3$ is:

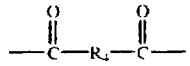

$R_4$ is:

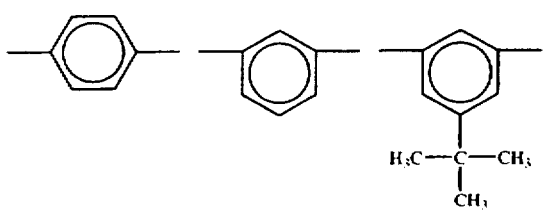

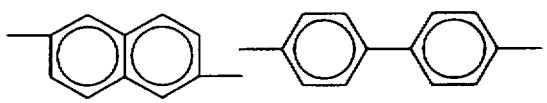

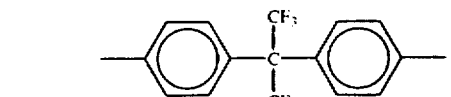

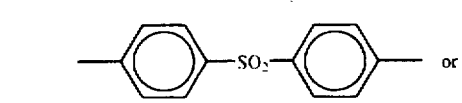

or

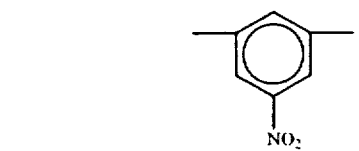

(ii) if $R_1$ and $R_2$ both are not proton (H), $R_1$ represents a single bond, and $R_2$ and $R_3$ cooperatively have the following structure:
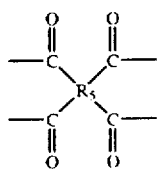
$R_5$ is:
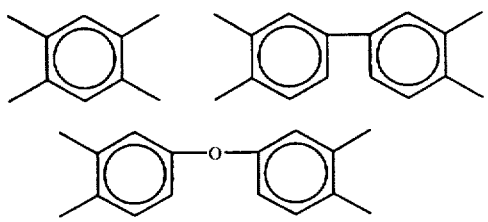
-continued
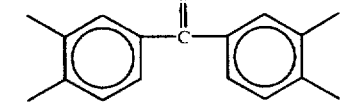
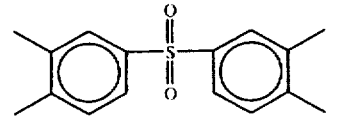 or
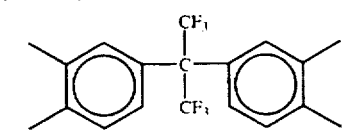
(iii) if $R_1$ and $R_2$ both are not proton (H), $R_1$ represents a single bond, and $R_2$ and $R_3$ cooperatively have the following structure:
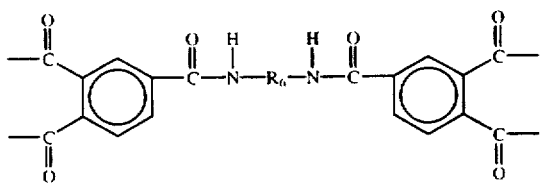
$R_6$ is:
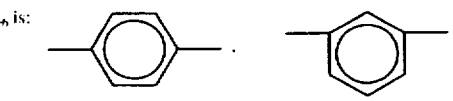
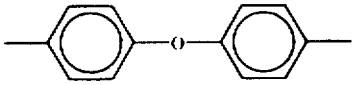
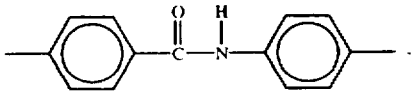
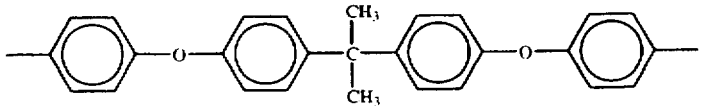
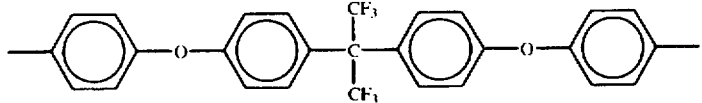
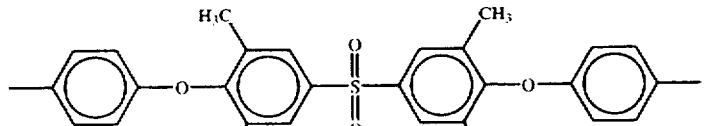
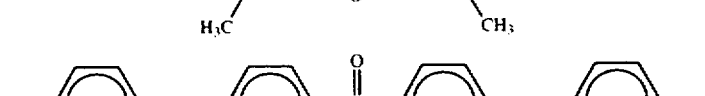
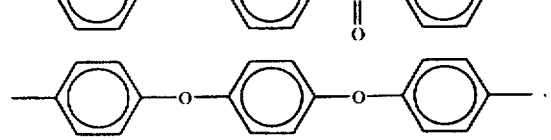

-continued

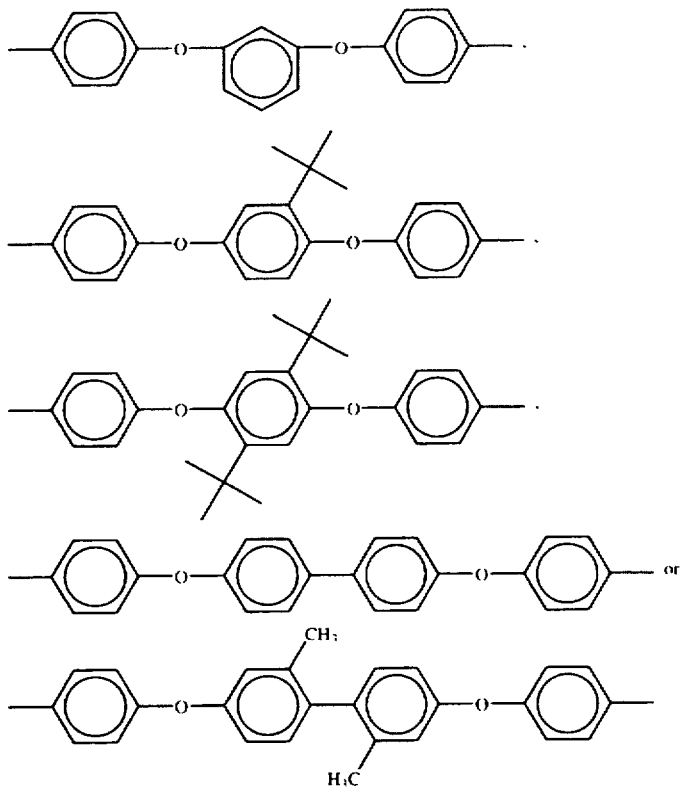

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
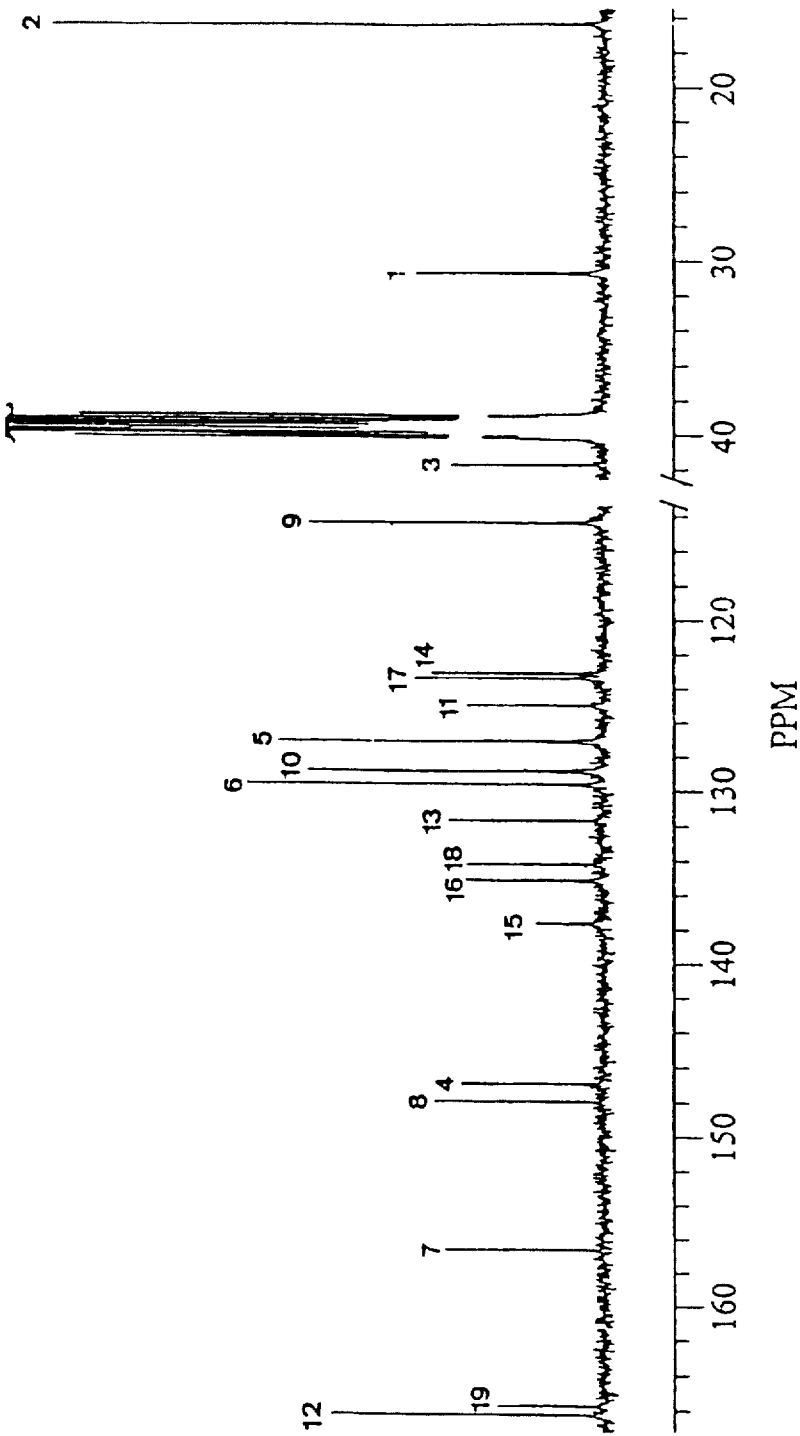
FIG. 1 is the $^1$H-NMR spectrum of the new diimide-diacid, 3,3',5,5'-tetramethyl-2,2-bis[4-(4-trimellitimidophenoxy)phenyl]propane (TBTPP)

The diamine, 3,3',5,5'-tetramethyl-2,2-bis[4-(4-aminophenoxy)phenyl]propane (TBAPP) was synthesized in two steps by the aromatic nucleophilic substitution reaction of 2,2-bis(4-hydroxy-3,5-dimethylphenyl)propane and p-chloronitrobenzene in the presence of $K_2CO_3$, to obtain the dinitro compound, followed by reduction with hydrazine monohydrate/10% palladium on activated carbon. The chemical reaction formula will be as follow:

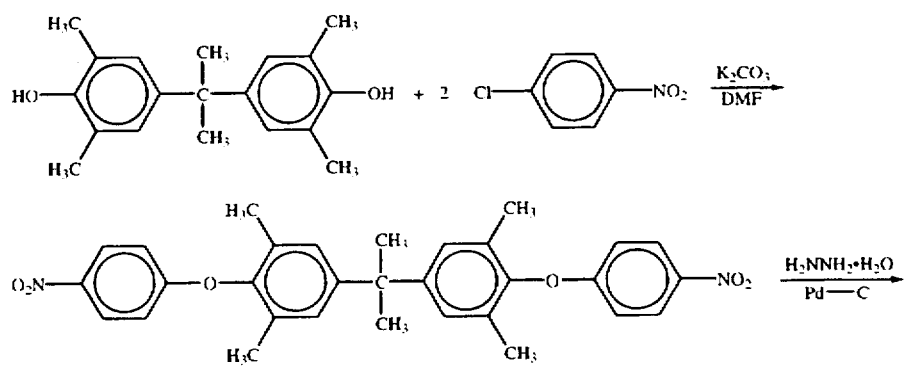

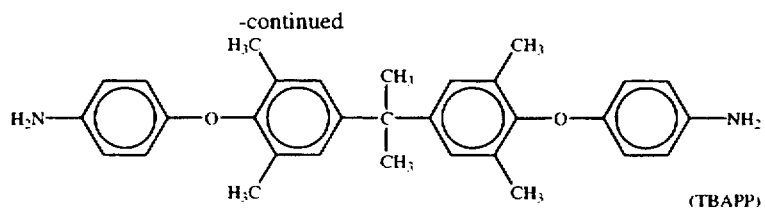

(TBAPP)

The diimide-diacid, 3,3',5,5'-tetramethyl-2,2-bis[4-(4-trimellitimidophenoxy)phenyl]propane (TBTPP), is condensed from one mole diamine TBAPP and two moles trimellitic anhydride. The chemical reaction equations is as follows:

the most suitable condensing agents is the triphenyl phosphite/pyridine system. We can use an aprotic solvent of the amide type such as DMAc (N,N-dimethylacetamide) or NMP (N-methyl-2-pyrrolidinone) and a solution promoter

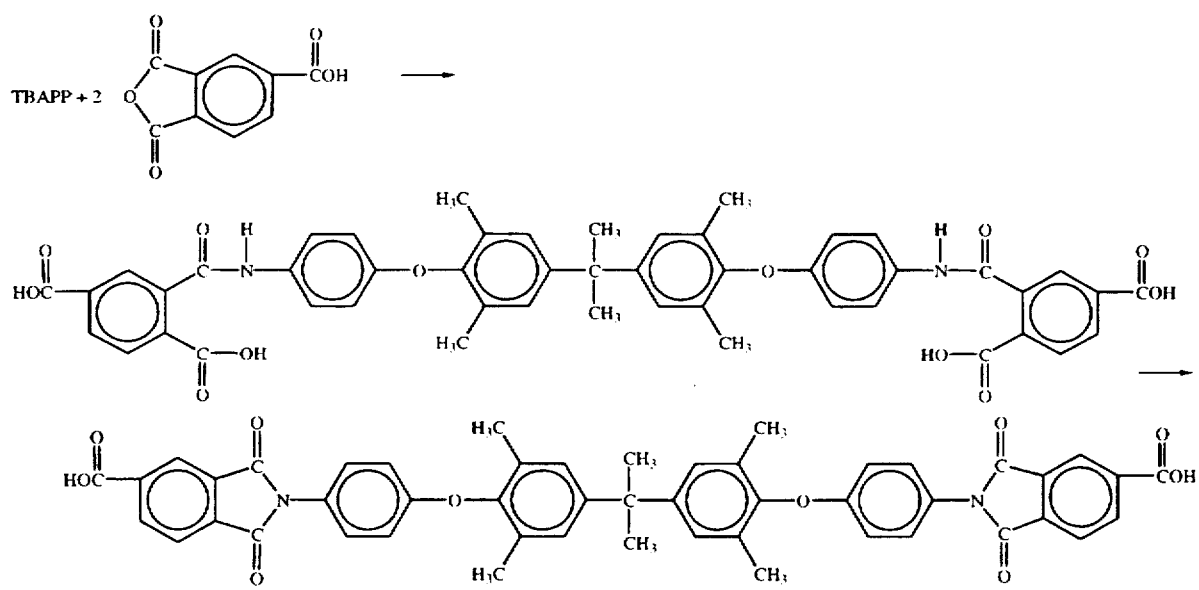

Polymers according to the present invention capable of being polymerized from the present diamine (TBAPP) and diimide-diacid (TBTPP) include polyamides, polyimides and poly(amide-imide)s, the preparing methods of which are respectively described in the following.

The polyamides can be synthesized by polycondensating the diamine TBAPP and the dicarboxylic acid using a condensing agent to carry out the polycondensation. One of such as LiCl or $CaCl_2$ to undergo the direct reaction for the manufacture of polyamides. The chemical reaction equation is as follows:

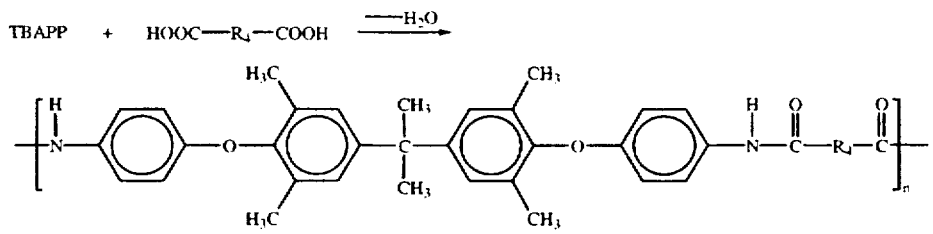

wherein $R_4$ is as described in the Summary.

The polyimides can be prepared by the polyaddition of the diamine TBAPP and the dianhydride in the proper aprotic solvent such as DMAc or m-cresol to form the poly(amic acid). Then the poly(amic acid) is added a dehydrating agent to produce polyimides. The chemical reaction equation is as follows:

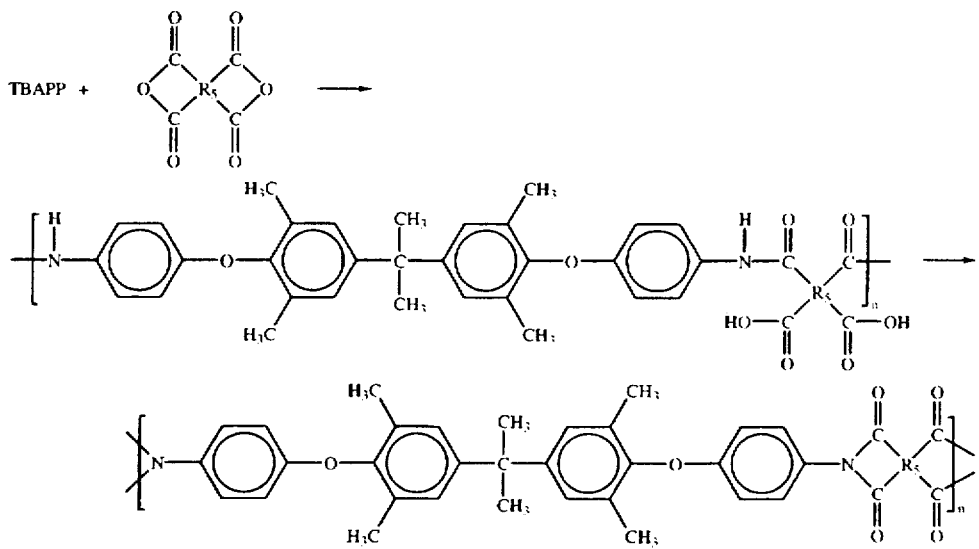

wherein $R_5$ is as described in the Summary.

The poly(amide-imide)s can be polycondensation in the aprotic solution from the diimide-diacid (TBTPP) with one of the family of diamines. The chemical reaction equations therefore are as follows:

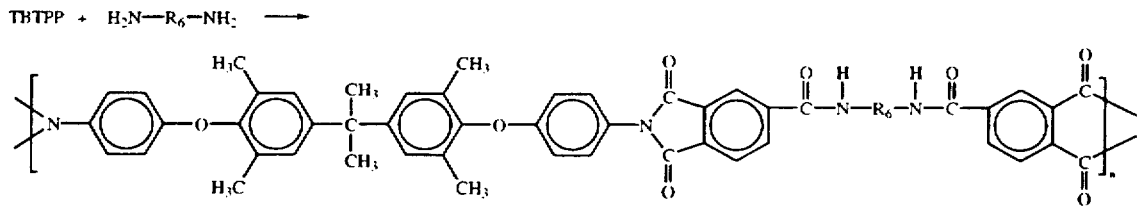

where $R_6$ is as described in the Summary.

The polyamides, polyimides and poly(amide-imide)s prepared according to the present invention preferably have an inherent viscosity of 0.87–1.56 dL $g^{-1}$, 0.84–1.16 $g^{-1}$ and 0.57–1.03 dL $g^{-1}$, respectively.

Some exemplary processes for preparing the compounds and the polymers according to the present invention are described in details hereinafter. The preparation of the diamine (3,3',5,5'-tetramethyl-2,2-bis[4-(4-aminophenoxy)phenyl]propane, TBAPP):

The dinitro compound was synthesized by the reaction of bis(4-hydroxy-3,5-dimethylphenyl)propane 77 g (270 mmol) and p-chloronitrobenzene 90 g (570 mmol) in the presence of potassium carbonate 87 g and N,N-dimethylformamide (DMF) 400 mL at 160° C. for 8 hrs. The solution was then cooled and poured into methanol-water mixture. The crude product was recrystallized from glacial acetic acid to provide yellow crystal (m.p. 192–193° C.) in 90% yield. The IR spectrum (KBr) exhibited absorptions at 1581 and 1341 $cm^{-1}$ ($NO_2$), 1240 $cm^{-1}$ (C—O—C). $^1H$—NMR ($CDCl_3$): δ (ppm)=8.21 (d, 4H), 6.99 (s, 4H), 6.85 (d, 4H), 2.09 (s, 12H), 1.70 (s, 6H). $^{13}C$—NMR ($CDCl_3$): δ (ppm)=162.93, 148.10, 148.04, 142.07, 130.04, 127.66, 126.15, 114.82, 42.18, 30.99, 16.49.

Elementary analysis:
Calculated values: C, 70.71%; H, 5.74%; N, 5.32%;
Analytical values: C, 70.21%; H, 5.75%; N, 5.20%.

The obtained dinitro compound 40 g (85 mmol), 0.3 g of 10% palladium on activated carbon (Pd/C), and 200 mL ethanol were introduced into a three-necked flask to which 150 mL of hydrazine monohydrate was added dropwise at 85° C. After the addition was complete, the reaction was continued at reflux temperature for another 24 h. The mixture was then filtered to remove Pd—C. After cooling, the precipitated needle crystals were isolated by filtration and recrystallized from ethanol in 86% yield (mp 164–165° C.). The IR spectrum (KBr) exhibited absorptions at 3394 and 3314 $cm^{-1}$ (N—H), 1223 $cm^{-1}$ (C—O—C). $^1H$—NMR ($CDCl_3$): δ (ppm)=6.92 (s, 4H), 6.58 (s, 8H), 3.41 (s, 4H), 2.08 (s, 12H), 1.65 (s, 6H). $^{13}C$—NMR ($CDCl_3$): δ (ppm)= 151.17, 149.35, 146.90, 140.08, 130.54, 127.25, 116.41, 115.31, 41.93, 31.07, 16.64.

Elementary analysis:
Calculated values: C, 79.79%; H, 7.34%; N, 6.01%;
Analytical values: C, 79.83%; H, 7.29%; N, 6.01%.

Figure 2:
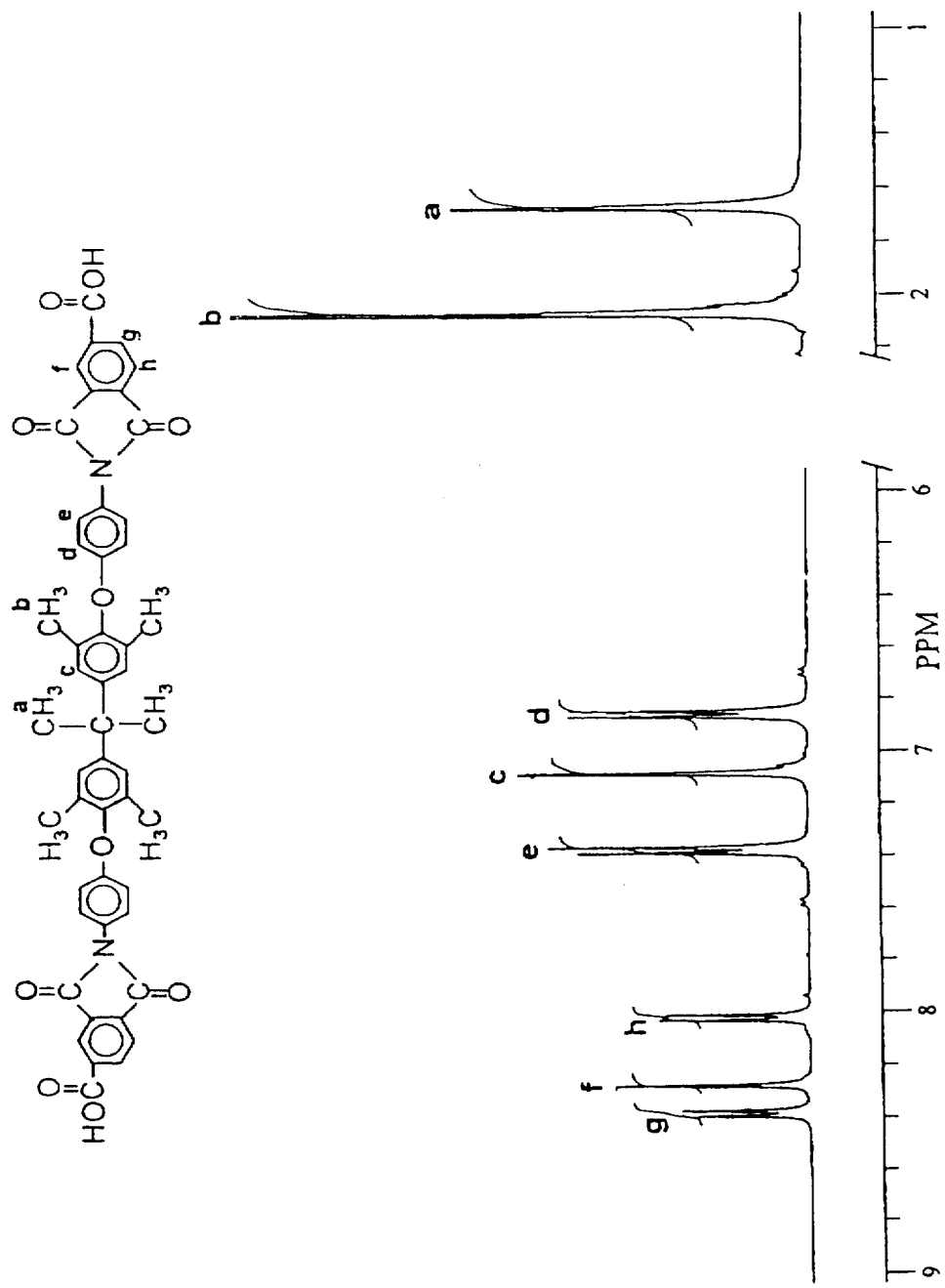
FIG. 2 is the $^{13}$C—NMR spectrum of the new diimide-diacid, 3,3',5,5'-tetramethyl-2,2-bis[4-(4-trimellitimidophenoxy)phenyl]propane (TBTPP)

The preparation of diimide-diacids (3,3',5,5'-tetramethyl-2,2-bis[4-(4-trimellitimidophenoxy)phenyl]propane, TBTPP):

A flask was charged with 16.0 g (34.5 mmol) of TBTPP, 13.6 g (71.3 mmol) of trimellitic anhydride, and 50 mL of DMF. The mixture was stirred at room temperature for 5 h under argon atmosphere. The solution was added 40 mL of acetic anhydride and 25 mL of pyridine with stirring at room temperature for 1 h and then heated at 100° C. for 4 h. After cooling, the reaction mixture was poured into methanol, producing yellowish precipitate that was washed thoroughly with methanol. Yield: 86%, m.p. 242–243° C. The IR spectrum (KBr) exhibited absorptions at 3460 $cm^{-1}$ (—OH, carboxylic acid), 1769 cm$^{-1}$ (imide C=O asymmetrical stretching), and 1715 cm$^{-1}$ (imide C=O symmetrical stretching and acid C=O stretching). $^1$H—NMR and $^{13}$C—NMR spectra of TBTPP in DMSO-d$_6$ appear in FIGS. 1 and 2, respectively.

Elementary analysis:
Calculated values: C, 68.96%; H, 4.05%; N, 4.02%;
Analytical values: C, 68.70%; H, 4.22%; N, 4.06%.

The preparation of polyamide:

A mixture of 6.99 g (15 mmol) of diamine TBAPP, 3.24 g (15 mmol) of diacid 2,6-naphthalenedicarboxylic acid, 3 g of calcium chloride, 9 mL of triphenyl phosphite, 9 mL of pyridine, and 60 mL of NMP was heated with stirring at 100° C. for 3 hours under nitrogen stream. After cooling, the reaction mixture was poured into a large amount of methanol with constant stirring, producing a stringy precipitate that was washed thoroughly with methanol and hot water, collected on a filter, and dried at 100° C. under vacuum for 24 hours. The inherent viscosity of the polymer in N,N-dimethylacetamide was 1.04 dL g$^{-1}$, measured at a concentration 0.5 g dL$^{-1}$ at 30° C. The IR spectrum (film) exhibited absorptions at 3306 cm (N—H) and 1660 cm$^{-1}$ (C=O).

Elementary Analysis: (C$_{43}$H$_{38}$N$_2$O$_4$)$_n$
Calculated values: C, 79.78%; H, 5.88%; N, 4.33%;
Analytical values: C, 79.19%; H, 5.78%; N, 4.17%.

Mechanical properties: tensile strength: 100 MPa; elongation at break: 7%; tensile modulus: 2.49 GPa.

Solubility: the polymer is soluble in NMP, DMAc, N,N-dimethylformamide, dimethylsulfoxide (DMSO), m-cresol and pyridine.

Thermal properties: glass transition temperature: 239° C.; temperature at 10% weight loss in air: 466° C.; temperature at 10% weight loss in nitrogen: 450° C.; char yield in nitrogen at 800° C.: 56%.

Molecular structure:

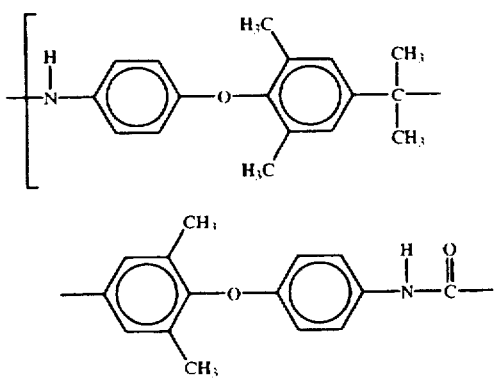

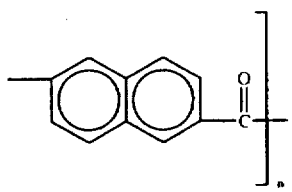

The preparation of the polyimide:

To a stirred solution of 5.83 g (12.5 mmol) of TBAPP in 30 mL of DMAc, was added gradually 4.02 g (12.5 mmol) of 3,3',4,4'-benzophenonetetracarboxylic dianhydride. The mixture was stirred at room temperature for 2 hrs under argon atmosphere. The inherent viscosity of the poly(amic acid) in DMAc was 1.46 dL g$^{-1}$, measured at a concentration of 0.5 g dL$^{-1}$ at 30° C. The poly(amic acid) solution obtained was added a mixture of acetic anhydride and pyridine (volume ratio 2:1) into the above-mentioned poly(amic acid) solution with stirring at room temperature for 1 h, and then heating at 100° C. for 3 h. The polymer solution was poured into methanol. The precipitate was collected by filtration, washed thoroughly with methanol and hot water, and dried at 100° C. under vacuum. The inherent viscosity of the poly(amic acid) in DMAc was 0.93 dL g$^{-1}$, measured at a concentration of 0.5 g dL$^{-1}$ at 30° C. The IR spectrum exhibited absorptions at 1771 and 1716 cm$^{-1}$ (imide C=O), and 1372 cm$^{-1}$ (C—N—C).

Elementary Analysis: (C$_{48}$H$_{36}$N$_2$O$_7$)$_n$

Calculated values: C, 76.58%; H, 4.82%; N, 3.72%;

Analytical values: C, 75.29%; H, 4.78%; N, 3.59%.

Mechanical properties: tensile strength: 74 MPa; elongation at break: 4%; tensile modulus: 2.09 GPa.

Solubility: the polymer is soluble in NMP, DMAc, N,N-dimethylformamide, dimethylsulfoxide, m-cresol and pyridine.

Thermal properties: glass transition temperature: 265° C.; temperature at 10% weight loss in nitrogen: 479° C.; char yield in nitrogen at 800° C.: 42%.

Molecular structure:

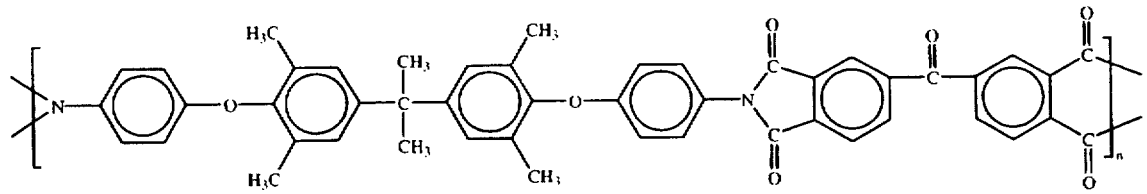

The preparation of the poly(amide-imide):

A mixture of 5.296 g (6.5 mmol) of diimide-diacid TBTPP, 2.395 g (6.5 mmol) of diamine 4,4'-bis(4-aminophenoxy)biphenyl, 2.5 g of calcium chloride, 7 mL of triphenyl phosphite, 6 mL of pyridine, and 20 mL of NMP was heated with stirring at 100° C. for 2 h. After cooling, the reaction mixture was poured into large amount methanol with constant stirring, producing a stringy precipitate that was washed thoroughly with methanol and hot water, collected on a filter, and dried at 100° C. under vacuum. The inherent viscosity of the polymer in DMAc was 0.96 dL g$^{-1}$, measured at a concentration 0.5 g dL$^{-1}$ at 30° C. IR spectrum: the ring at 1770 and 1717 cm$^{-1}$ (imide C=O), 3338 cm$^{-1}$ (amide N—H) and 1668 cm$^{-1}$ (amide C=O).

Elementary Analysis: $(C_{73}H_{54}N_4O_{10})_n$
calculated values: C, 76.40%; H, 4.74%; N, 4.88%;
analytical values: C, 74.60%; H, 4.89%; N, 4.83% (with moisture absorption 1.75%).
revised values: C, 75.93%; H, 4.81%; N, 4.91%.

Mechanical properties: tensile strength: 109 MPa; elongation at break: 6%; tensile modulus: 3.2 GPa.

Solubility: the polymer is soluble in NMP, DMAc, N,N-dimethylformamide, m-cresol , pyridine and tetrahydrofuran.

Thermal properties: glass transition temperature: 262° C.; temperature at 10% weight loss in nitrogen: 477° C.; temperature at 10% weight loss in oxygen: 471° C.; char yield in nitrogen at 800° C.: 56%.

Molecular structure:

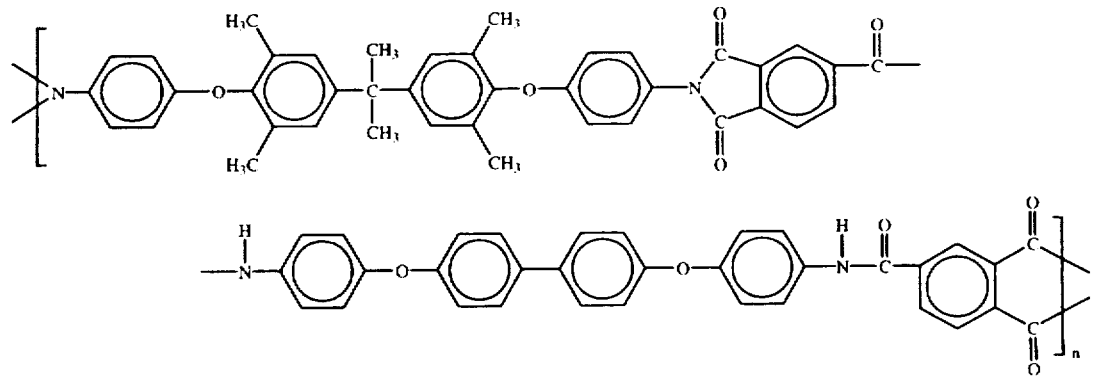

Many changes and modifications in the above described embodiment of the invention can, of course, be carried out without departing from the scope thereof, accordingly, to promote the progress in science and the useful arts, the invention is disclosed and is intended to be limited only by the scope of the appended claims.

What is claimed is:

1. A polyamide polymer having the following structure:

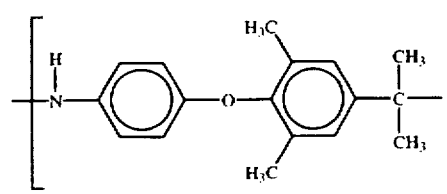

-continued

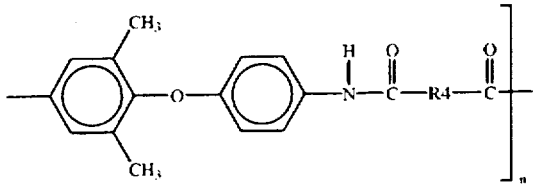

wherein R4 is selected from

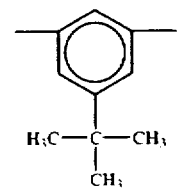

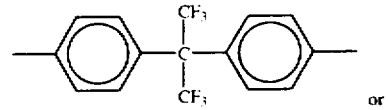

or

-continued

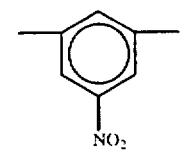

wherein said polymer is prepared by polymerization of 3,3',5,5'-tetramethyl-2,2-bis{4-(4-aminophenoxy)-phenyl}propane having the following formula:

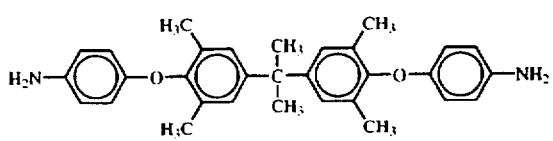

with an equimolar amount of an aromatic dicarboxylic acid in N-methyl-2-pyrrolidinone at 100° C. for two hours using triphenyl phosphite and pyridine as a condensing agent.

2. A polyamide polymer having the following structure:

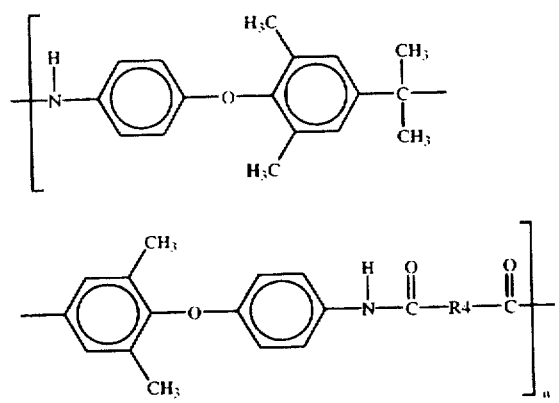

wherein R4 is selected from

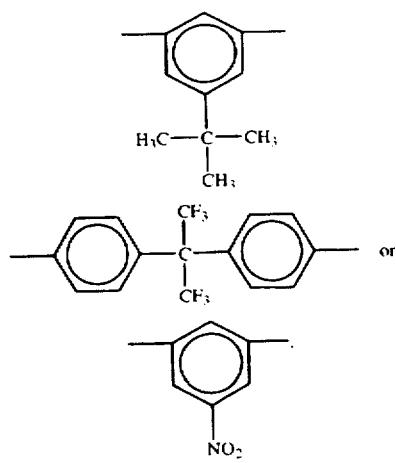

3. The polymer according to claim 1, wherein said polymer has an inherent viscosity of 0.87–1.56 dL g$^{-1}$ measured at a concentration of 0.5 g dL$^{-1}$ in N,N-dimethylacetamide at 30° C.

4. A polyamide polymer having the following structure:

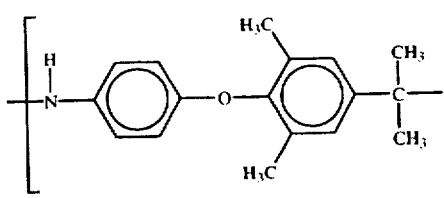

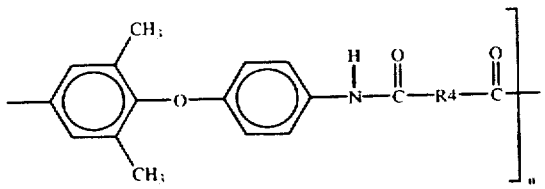

wherein R4 is selected from the group consisting of

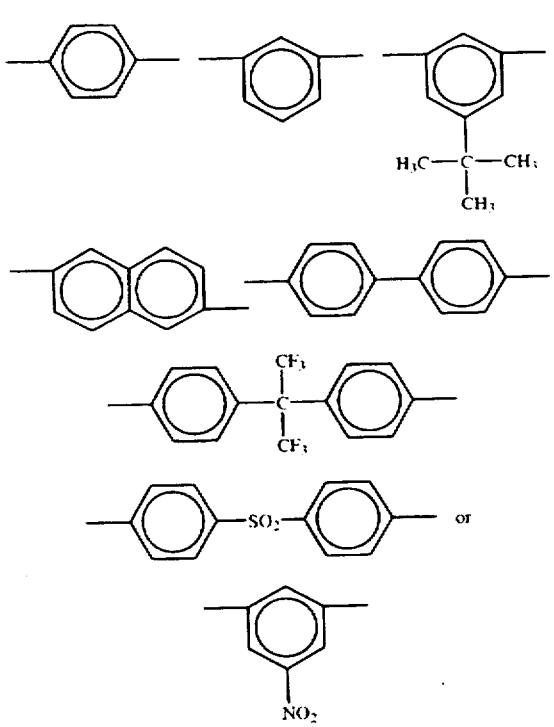

wherein said polymer has an inherent viscosity of 0.87–1.56 dL g$^{-1}$ measured at a concentration of 0.5 g dL$^{-1}$ in N,N-dimethylacetamide at 30° C.

5. The polymer according to claim 2, wherein said polymer has an inherent viscosity of 0.87–1.56 dL g$^{-1}$, measured in N,N-dimethylacetamide at a concentration 0.5 g dL$^{-1}$ at 30° C.

* * * * *